United States Patent [19]

Thomas

[11] 3,863,574

[45] Feb. 4, 1975

[54] POWER SUPPLY FOR HIGH SPEED VEHICLES

[75] Inventor: Johann Thomas, Erlangen, Germany

[73] Assignee: Siemens Aktiengesellschaft, Munchen, Germany

[22] Filed: Feb. 6, 1974

[21] Appl. No.: 440,027

[30] Foreign Application Priority Data
Feb. 8, 1973 Germany............................ 2306292

[52] U.S. Cl............................. 104/148 LM, 318/135
[51] Int. Cl............................................... B60m 7/00
[58] Field of Search................ 104/148 LM; 191/10; 318/135, 121; 310/13

[56] References Cited
UNITED STATES PATENTS
3,577,929  5/1971  Onoda .................. 318/135

Primary Examiner—M. Henson Wood, Jr.
Assistant Examiner—Reinhard J. Eisenzopf
Attorney, Agent, or Firm—Kenyon & Kenyon Reilly Carr & Chapin

[57] ABSTRACT

This invention provides an improved power supply which allows vehicles, such as rapid-transit railroads, to operate above a predetermined speed without using the conventional third rail and collector-shoe gear as the means of transmitting energy to the vehicle motor. A second propulsion means is provided which inductively couples an additional rail paralleling the main rail to the vehicle. The additional rail acts as the primary of a transformer mounted within the vehicle. At predetermined intervals along the right of way of the vehicle, converter circuits operated from within the vehicle, are physically located. These converters create a pulsating current in the additional rail which is sensed by the secondary of the transformer mounted in the vehicle. The secondary voltage is rectified and inverted to yet another higher frequency which in turn drives the vehicle motor.

8 Claims, 7 Drawing Figures

3,863,574

POWER SUPPLY FOR HIGH SPEED VEHICLES

BACKGROUND OF THE INVENTION

1. Field of the Invention

This invention concerns an apparatus for powering vehicles such as rapid-transit railroads and particularly, suitable apparatus for powering the vehicles at relatively high speeds.

2. Description of the Prior Art

The motors of electrically propelled vehicles, e.g., electric locomotives or trolley cars, are usually connected to a dc or ac source via live rails or trolley wires and sliding contact shoes mounted on the vehicle. For mechanical reasons considerable difficulties are encountered in providing the necessary power for propulsion at high speeds through the use of contact shoes. It is an object of the invention to transmit the required propulsion power to vehicles operating at high speed without contacts.

SUMMARY OF THE INVENTION

This invention provides a second propulsion means which is inductively coupled to an additional rail which parallels the main power rails. This second means takes over the propulsion of the vehicle at some predetermined speed at which the standard propulsion means, utilizing contact shoes, cuts out. The second propulsion means utilizes the additional rail as the primary of a transformer mounted on the vehicle. As the vehicles passes by particular sections of track, converters physically located in the vicinity of that section are energized by control units actuated from the vehicle. These converters alternately connect first one power rail to the additional rail and then the second power rail thereto. The pulsating current in the additional rail is inductively coupled to the transformer mounted on the vehicle. The voltage appearing at the secondary is rectified and inverted to a higher frequency than the power supplied over the power rails. The inverter, in turn, drives the motor needed to power the train. The inverter, additionally, generates the basic control signal which is used to actuate the particular control units associated with the given section of track which the vehicle is then passing.

An alternate embodiment describes how the additional rail having a prescribed configuration can be used as a primary part of the vehicle propulsion drive.

DESCRIPTION OF THE PREFERRED EMBODIMENTS

Figure 1:
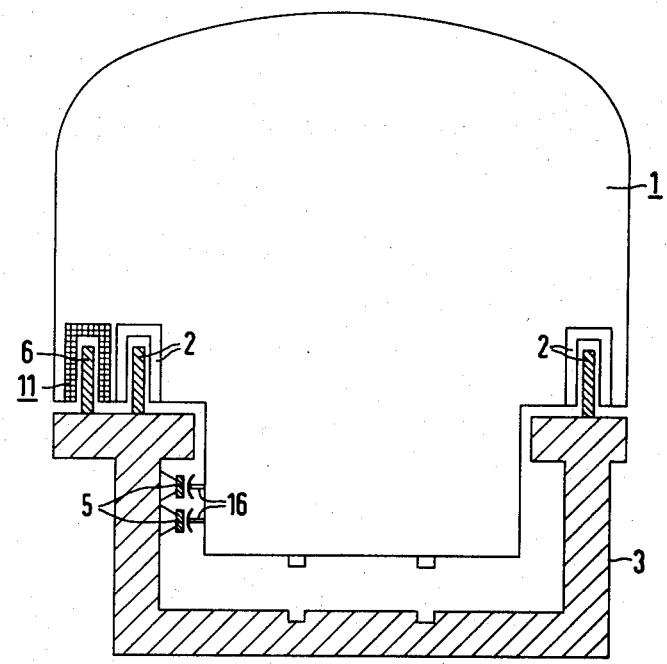
FIG. 1 is a schematic view depicting the relationship between a vehicle and part of the propulsion means associated with the invention.

FIG. 1 is a schematic representation showing an outline of a vehicle, 1, such as a magnet-cushion suspension railroad car, which is propelled by linear motors shown schematically by the numeral 2. The vehicle is propelled along the road bed designated as 3. The vehicle includes standard propulsion means wherein the power available on rails, 5, is transmitted to the vehicle by means of the sliding contacts, 16. FIG. 1 also shows in schematic form, the provision of an additional rail, 6, which forms the primary of a transformer, identified as 11, the secondary of which is carried within the vehicle 1. The particular construction of transformer 11 will be further described in the section pertaining to FIG. 3.

Figure 2:
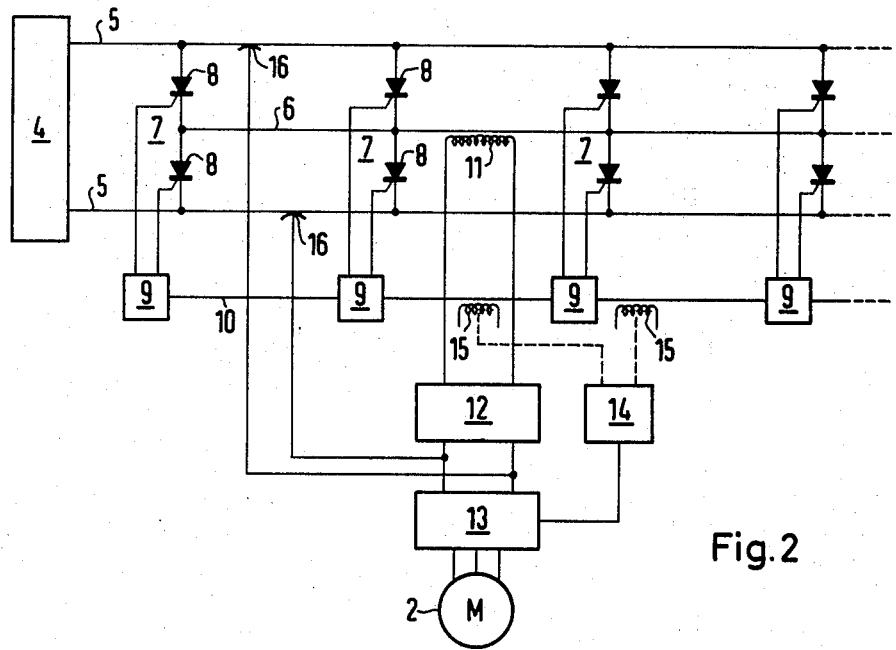
FIG. 2 is a schematic diagram of part of the invention.

FIG. 2 is a schematic representation of the power supply according to the present invention. A circuit, suitable for propelling the vehicle below a certain predetermined speed, includes the following arrangement of elements. The power rails, 5 are supplied by a source of dc or ac power, 4. This power is transmitted to an inverter, 13, within the vehicle 1, by a pair of sliding contacts, 16. The inverter 13, converts the dc or ac, to ac power of higher frequency which is suitable for energizing the propulsion motor 2. At the predetermined speed, on the order of 150 km/hour the sliding contacts 16 are lifted from the power rails and the high speed propulsion system takes over. The velocity dependent switch over can be triggered, for instance, by a suitable output signal from the inverter 13 which is proportional to the speed of the vehicle.

As noted above, when the predetermined speed is achieved by the vehicle, the vehicle is then powered by a second propulsion system. This latter system includes a plurality of converter branches, 7, said branches constituting approximately equal length sections of power rails 5 and 6 such that for n such sections there are n + 1 of said branches, 7.

Each of the converter branches includes a thyristor connected between each of the power rails 5 and the additional rail 6. The thyristors or SCRs are identified by the numeral 8.

The anode of one of said SCRs would be connected to the power rail 5 with its cathode connected to rail 6, while the anode of the other SCR is connected to rail 6 while its cathode is connected to the other power rail, 5. The gates for each of the SCRs are driven by a control unit 9 associated with each converter branch. Interconnecting each of the control units 9 is a signal line 10. The control units 9 respond to gating signals which appear on line 10 and which are inductively coupled into line 10 by the primary windings of two auxiliary transformers 15. In fact, the connecting line 10 between the control units form the secondary winding for the auxiliary transformers. The two auxiliary transformers 15 enable energization of at least two control units 9 so that during the passing of the vehicle at least two converters are in operation simultaneously and as a result, a maximum of two sections of rail 6 will carry the ac voltage generated by the converter branches 7. An alternate approach for activating the control units 9 can employ suitable opto-electronic means instead of the transformer technique previously described. The control signals actuating the control units 9 originate initially in the inverter 13. A suitable output from the inverter 13 is supplied to a control unit 14 which shapes the output of the inverter 13 and provides a signal to the primary of transformers 15 when the predetermined speed is reached, which can be inductively coupled to the line 10 for activating the control unit 9. The control unit 14 would include some type of threshold detector which would allow passage of signals emanating from the inverter 13 once the predetermined speed had been achieved.

The rail 6 connected by the converter branches, 7, alternately to either one of the power rails 5, forms the primary winding of a transformer 11 whose iron core and secondary winding are located within the vehicle. Once the predetermined speed is reached, and the converter branches 7 are activated, power flows through the additional rail 6 in a pulsating fashion. The secondary winding of the transformer 11, supplies the pulsating power to a rectifier 12 which in turn drives the inverter 13.

Figure 3:
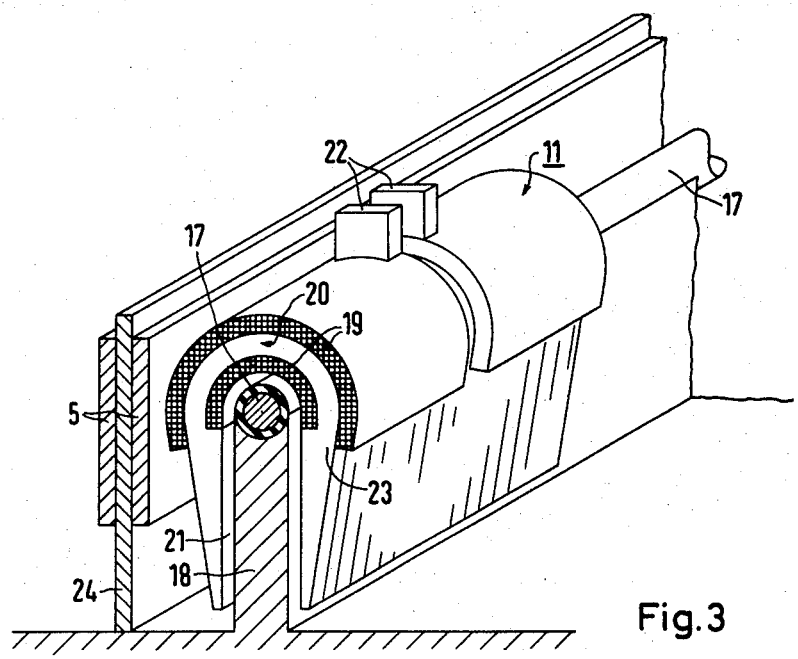
FIG. 3 is a perspective view of a portion of the invention.
Figure 4:
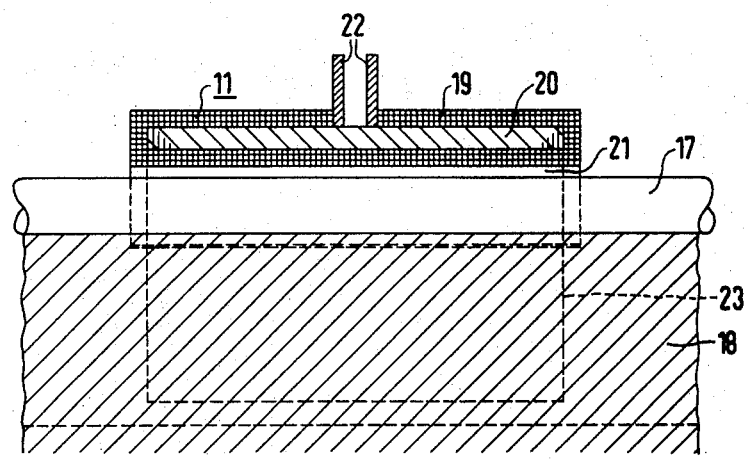
FIG. 4 is a side elevation view of a certain portion of the invention depicted in FIG. 3.

FIGS. 3 and 4 will be useful in explaining a particular embodiment of the transformer 11. The transmission rail 6, which constitutes the primary winding of the transformer, is shown as an insulated cable 17 secured to a stand 18 which can be made out of concrete. The power rails 5 are arranged on a second concrete stand running parallel to the first, and which is placed as close as possible to the stand 18 to reduce stray inductance.

Internal to the vehicle is an essentially U-shaped, laminated iron core 20 of high permeability material. This core forms an air gap 21 with the stand and cable. The yoke of the core carries the secondary winding 19 of the transformer 11. The ends of the secondary winding are tied to connecting lugs 22 which couple the secondary winding 19 to wires running to the rectifier circuit 12. The bars 23 of the iron core which are shown tapered in FIG. 3, extend the air gap 21 down past the cable 17 in order to keep the induction and therefore the magnetizing current low.

Figure 5:
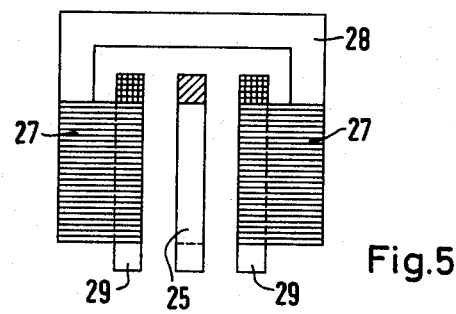
FIG. 5 is a sectional view of an alternate means of transmitting power between the rails and the vehicle.
Figure 6:
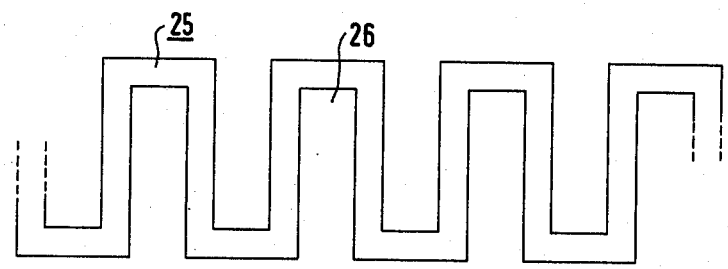
FIG. 6 is a schematic representation of a portion of the alternate embodiment of FIG. 5.

FIGS. 5 and 6 show an alternate embodiment to the approach shown in FIGS. 3 and 4. In FIGS. 5 and 6, the additional rail 6 is shown configured as a current rail 25 wound in the manner of a wave winding. In this embodiment, a loop 26 of the wave winding always forms a magnetic pole, whose polarity alternates at the frequency of the gate voltage supplied by the control units 9. The portion contained on the vehicle, includes two elongated laminated iron stacks 27 which are mechanically connected to each other by a support bracket 28 and which extend for a distance, parallel to the transmission rail 25. These stacks, 27, of iron laminations carry in corresponding slots a multi-phase wave winding 29 which forms the secondary winding having the same pole pitch as the current rail 25. In the case of a three-phase secondary winding the three windings are displaced relative to each other by one-third of the pole pitch. As with the embodiment for the transformer 11 shown in FIG. 2, the voltage induced in the secondary winding of the transformer of FIGS. 5 and 6 is supplied by suitable means to the rectifier 12 which in turn drives the inverter 13 wherein the power is converted into a frequency suitable for driving the motor 2.

Figure 7:
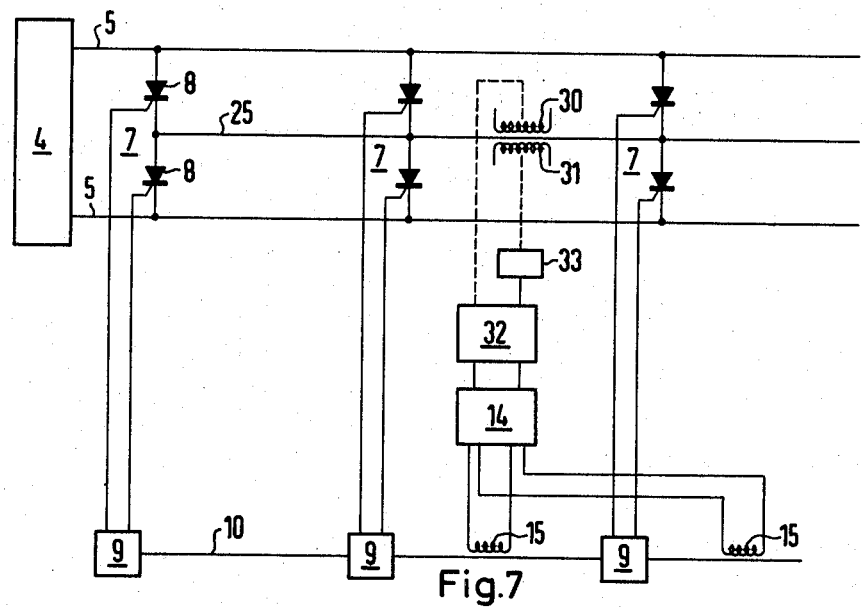
FIG. 7 is an alternate embodiment of a portion of the invention.

The arrangement depicted in FIG. 5 can be adapted such that the multi-phase wave winding 29 becomes, in fact, the secondary windings of the linear motor 2. FIG. 7 shows in schematic form, this variation of the invention. In FIG. 7, the secondary windings are identified as numeral 30 which, similar to the construction shown in FIG. 5, are wave windings. Each of the multi-phase windings are provided with a suitable short-circuiting device 32 which is operated by a suitable control unit 33 responding to the pulsating signals appearing on rail 25 when the threshold speed is exceeded. The short-circuiting devices, 32, may each contain, for instance two SCRs connected in an anti-parallel arrangement across the secondary windings. The auxiliary windings 31 which provide the control pulses for the control unit 33 have a similar construction as the secondary windings 30 in that they bear the same position regarding pole pitch relative to the primary winding as the secondary windings of the linear motor bear to the transmission rail 25.

When full power is required, each secondary winding is short circuited by the device 32 when the loops of the particular winding are coincident with the loops of the primary winding on the transmission rail. The short circuit is opened again when the secondary winding in question is shifted relative to the primary windings by half a pole pitch. By delaying the time when the short circuit is applied to a particular winding, the output on the linear motor can be reduced such that in turn, the vehicle speed can be controlled.

The operation of the linear motor results from the fact that the shorted secondary winding is repelled by the current-carrying primary winding as long as the primary and secondary windings are magnetically coupled to each other. When the loop of the secondary winding has advanced relative to the corresponding loop of the primary winding by half a pole pitch, the two windings are magnetically decoupled. At this point in time, two equal, but opposite flux components flow through the secondary winding with the result that no mutual induction effect takes place. It is at this point that the circuit shorting the secondary winding is interrupted. It is not closed again until maximum coupling between the primary and secondary winding is achieved.

The force action, thus, only occurs during the time of the short circuit. By employing a multi-phase winding, the force effect can be increased according to the number of phases employed, with the direction of travel of the linear motor being determined by the choice of sequence in applying short circuits to each of the phases.

As noted earlier if one delays the time at which a short circuit is applied, the power output of the motor is reduced. It is apparent, therefore, that this effect can be utilized to slow down the speed of the linear motor and in effect brake the vehicle.

Because the system of this invention is employed only at relatively high speeds, the period of time during which any one of the converter branches 7 may be energized is a relatively brief one. Thus the electronic switching elements of the branches 7, such as the SCRs 8 and their associated control circuit, dissipate a relatively small amount of heat which results in a relatively small package positioned at each of the predetermined locations.

Because of the medium frequency range of the converted signal, i.e., several kHz, the switching elements, (SCRs), for the converter branches should have a relatively short recovery time and where low power handling requirements exist, such as in small transport systems, transistors may be a suitable alternative.

The use of currents in the so-called medium frequency range as compared with the frequency of 16 2/3 or 50 kHz commonly used in railroad operation, allows for the use of smaller transformers in the vehicle. The use of medium frequency ac current developed in localized sections of track by the means disclosed in this invention foregoes the necessity of directly transmitting such power from the primary source of power 4 along the power rails. This latter approach would be uneconomical due to the fact that the inductive reactance of the power rails over such a distance would be too large requiring an unbelievably high source of energy to compensate for track impedance.

It is to be appreciated that changes in the above embodiments can be made without departing from the scope of the present invention. Other variations of the specific construction disclosed above can be made by those skilled in the art without departing from the invention as defined in the appended claims.

What is claimed is:

1. An apparatus for powering a vehicle above a predetermined speed which comprises;
   a. basic power means including a source of primary power and at least one transmission means parallel to the path of said vehicle, for carrying said primary power along said path;
   b. an additional power transmission means paralleling said path;
   c. a plurality of converter means each positioned at approximately equally spaced intervals of predetermined distance along said path;
   d. means for detecting when said vehicle has exceeded said predetermined speed;
   e. means responsive to said speed detecting means for energizing at least one of said converter means such that said primary power transmission means is electrically connected to said additional power transmission means at that point in the vehicle path at which said vehicle is then located; and
   f. means within said vehicles responsive to the power supplied to said additional transmission means, for powering said vehicle.

2. The apparatus of claim 1 where said means within said vehicle for powering said vehicle include a transformer means responsive to the power supplied to said additional transmission means and where said additional transmission means forms the primary winding of said transformer means.

3. The apparatus of claim 2 where said additional transmission means includes a cable extending along the path of said vehicle and where said transformer means includes a U-shaped core enveloping said cable and extending approximately coaxially therewith.

4. The apparatus of claim 2 where said additional transmission means is shaped in the manner of a wave winding and where said transformer means includes a core comprised of two elongated, laminated iron stacks, mechanically connected, and a secondary winding means having a wave winding shape with the same pole pitch as said additional transmission means, said elongated iron stacks mounted within the vehicle such that they parallel said additional transmission means.

5. The apparatus of claim 1 where each of said converter means includes:
   a. switch means interposed between said primary power transmission means and said additional transmission means;
   b. control circuit means for energizing said switch means in a pulsating fashion upon command; and where said means responsive to said speed detecting means includes:
   a. a control winding connected between each of said control circuit means;
   b. second transformer means mounted within said vehicle, said control winding forming the secondary winding of said second transformer means, said second transformer means, responsive to said speed detecting means, providing command pulses for said control circuit means which are a function of said vehicle's speed.

6. The apparatus of claim 1 which further comprises sliding means within said vehicle for contacting said primary power transmission means said sliding contact means removed from contact with said primary power transmission means above said predetermined speed and means within said vehicle, responsive to the primary power transmitted to said vehicle by said contacts, for propelling said vehicle below said predetermined speed.

7. The apparatus of claim 1 where said additional transmission means is shaped in the manner of a wave winding and where said means within said vehicle responsive to the power supplied to said additional transmission means comprises a linear motor having a multiphase secondary winding designed as a wave winding having the same pole pitch as said additional transmission means and where said secondary winding is arranged on two elongated laminated iron stacks, mechanically connected, and which move parallel to said additional transmission means.

8. The apparatus of claim 7 including means for short circuiting each phase of said multi-phase secondary winding at predetermined physical relationships between said additional transmission means and said each phase.

* * * * *